March 8, 1927.

R. C. MASON 1,619,876

POWER TRANSMISSION

Filed April 27, 1925

INVENTOR
Richard C. Mason.

ATTORNEY

Patented Mar. 8, 1927.

1,619,876

UNITED STATES PATENT OFFICE.

RICHARD C. MASON, OF TULSA, OKLAHOMA.

POWER TRANSMISSION.

Application filed April 27, 1925. Serial No. 26,088.

This invention relates to power transmission mechanism and the invention is primarily intended for but not necessarily limited to use in connection with oil well drill rigs. It contemplates the inclusion of a planetary system of variable speed mechanism such as is used in the transmission of the power plant of the well known motor vehicle made by the Ford Motor Company of Detroit, Michigan. It differs primarily from such construction, however, in that there is a shaft running entirely through the transmission with its ends in bearings or pillow blocks so that the shaft, which in the present case is the driven shaft, will be adequately supported in appropriate bearings so that it can take care of the work which it has to do.

The primary object of utilizing such a gearing is that it can be purchased in the open market, re-designed at slight cost, and applied to work other than Ford motor vehicle transmissions at very little cost.

The novel arrangement of the various parts whereby I obtain certain advantageous results will be clearly described hereinafter, reference being had to the accompanying drawings, in which—

Figure 1:
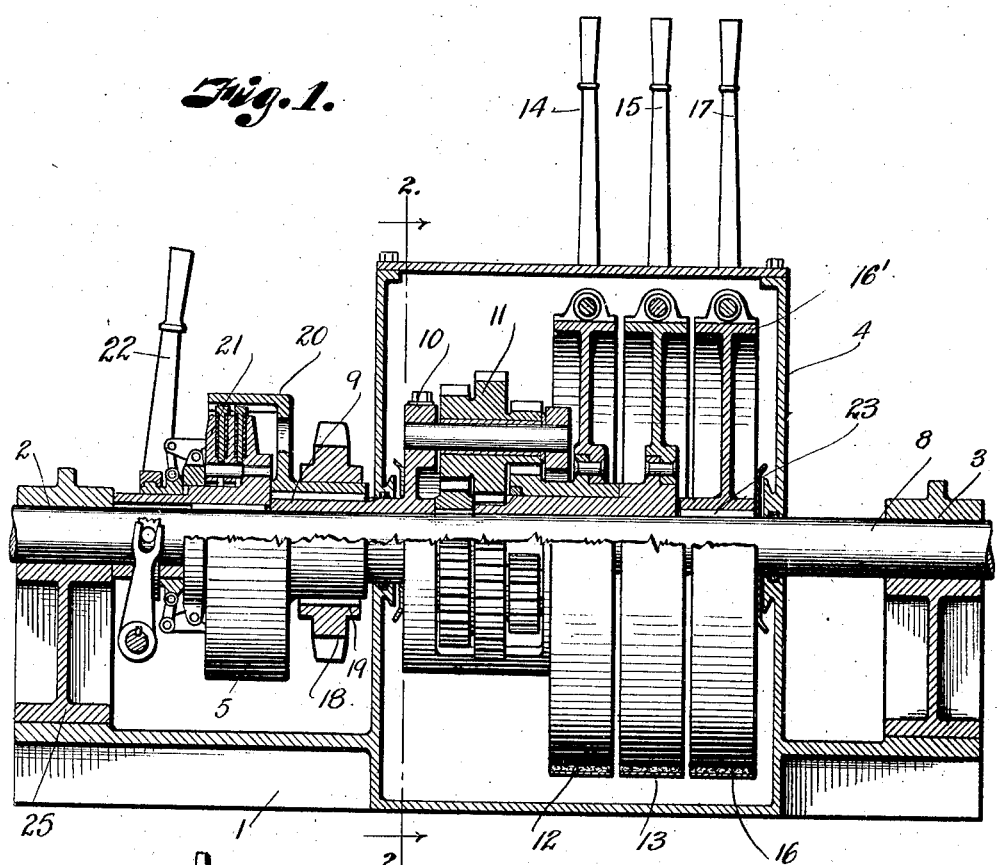
Figure 2:
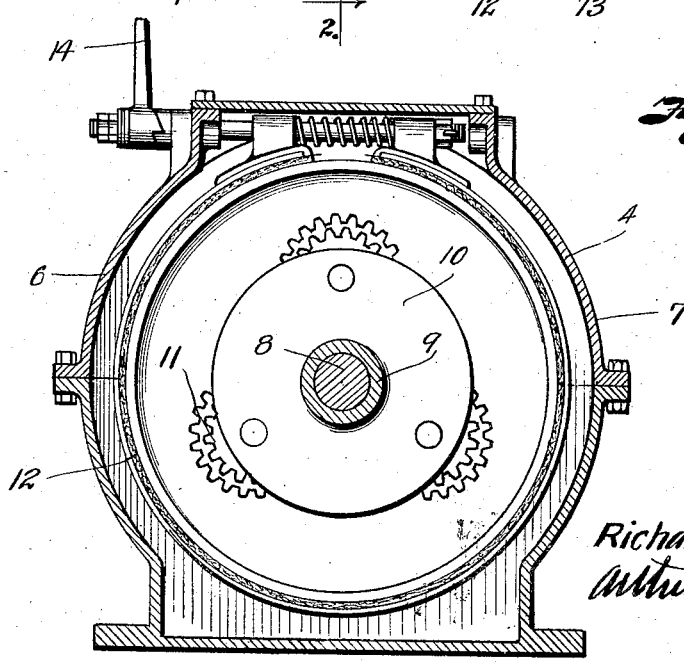

Fig. 1 is a view partly in side elevation and partly in section through a transmission constructed in accordance with my invention, and Fig. 2 is a section on the line 2—2 of Fig. 1.

Referring now to the drawings by numerals of reference:

1 designates a base on which are two bearings 2 and 3. The bearings 2 and 3 are spaced apart a sufficient distance to allow for the planetary gear housing 4 and for a clutch connection 5 between the housing 4 and the bearing 2. The housing 4 is shown as a substantially rectangular case with curved side walls 6 and 7.

Extending longitudinally is a shaft 8 which is mounted in the bearings 2 and 3. Loosely mounted upon the shaft 8 is the sleeve 9 of a gear carrier 10, the gear 11 being located within the housing. Loose upon the shaft 8 within the housing are the transmission bands 12 and 13 adapted to be operated by the levers 14 and 15 for reverse and low in the order named, and there is a brake band 16 within the housing operated by a lever 17.

All of this construction is common to the transmission disclosed in the Ford motor car above referred to so it is thought it is unnecessary to enter into an elaborate description of the gear ratios and relations of the several gears in this description.

Attention is called to the fact, however, that upon the sleeved portion 9 of the gear carrier 10 is a sprocket 18 which, of course, might be a gear to receive power from a power unit so that when the sprocket 18 turns, the gear carrier 10 will turn. The hub portion 19 of the sprocket also constitutes a hub for the female clutch member or socket member 20 which is adapted to receive the male member or disk clutch member 21, keyed to the shaft 8, the member 21 being actuated by a shift lever 22. When the sprocket 18 is rotating, the member 20 and the gear carrier 10 will rotate but no part of the transmission will be driven.

If the lever 14 is operated to contract the band 12, then the shaft 8 will be turned in a reverse direction. If the lever 14 is operated to release the transmission band 12 and the lever 15 is operated to contract the band 13, the shaft 8 will be turned in an ahead direction but at low speed. The brake lever 17 will operate the brake 16 in the usual way.

If, instead of operating any of the levers 14, 15 and 16 to effect the rotation or non-rotation of the shaft 8, the lever 22 will be operated to throw the clutch member 21 into engagement with the female clutch member 20; then the shaft 8 will be operated in direct ratio to the speed of the sprocket 18; that is, it will be operated at the same speed, or in high.

The levers will all be arranged so that they will be conveniently accessible to the operator.

It will be observed that the shaft 8 extends through the entire mechanism and that it is adequately supported by the bearings 2 and 3 so that it is capable of sustaining heavy loads, which would be impossible if inadequate bearing provisions were made.

The shaft may drive the bull wheel, calf wheel, sand reel or do any useful work around an oil well or, indeed, elsewhere, so I do not wish to be limited to any particular application of my invention.

As above stated, the transmission within the case 4 follows generically the construction of the transmission in the Ford motor vehicle so attention is called to the fact that the brake drum 16' is keyed to the shaft 8 at 23.

What I claim and desire to secure by Letters-Patent is:

1. In combination, two spaced aligning bearings, a shaft mounted in said bearings, a planetary gear carrier loose on the shaft, means for driving the carrier about the shaft, transmission bands on the shaft having means for operatively connecting and disconnecting the shaft to the planetary gearing, and means on the shaft for directly connecting the driving means to the shaft.

2. In combination, two aligning bearings, in spaced relation, a continuous shaft bridging the gap between the bearings, a planetary gearing including a carrier mounted loosely upon the shaft, a clutch member carried by the carrier, a pulley on the clutch member for driving the clutch member and the planetary gear carrier about the shaft, transmission bands on the shaft co-operating with the carrier, and a clutch member on the shaft co-operating with the first clutch member, the second clutch member having movement with respect to the first to lock the shaft and first clutch member together In testimony whereof I affix my signature.

RICHARD C. MASON